(12) United States Patent
Moenkemoeller

(10) Patent No.: US 9,640,064 B2
(45) Date of Patent: May 2, 2017

(54) SYSTEM FOR PASSING ELECTRICAL SIGNALS THROUGH A LIVING BODY

(71) Applicant: Ralf Moenkemoeller, Bielefeld (DE)

(72) Inventor: Ralf Moenkemoeller, Bielefeld (DE)

(73) Assignee: paragon AG, Delbrueck (DE)

( * ) Notice: Subject to any disclaimer, the term of this patent is extended or adjusted under 35 U.S.C. 154(b) by 0 days.

(21) Appl. No.: 14/612,688

(22) Filed: Feb. 3, 2015

(65) Prior Publication Data

US 2015/0243160 A1    Aug. 27, 2015

(30) Foreign Application Priority Data

Feb. 27, 2014 (DE) .................. 10 2014 002 828

(51) Int. Cl.
| G08C 17/02 | (2006.01) |
|---|---|
| B60R 21/015 | (2006.01) |
| B60N 2/00 | (2006.01) |

(52) U.S. Cl.
CPC ............ *G08C 17/02* (2013.01); *B60N 2/002* (2013.01); *B60R 21/01534* (2014.10)

(58) Field of Classification Search
CPC .... G08C 17/02; B60R 21/01534; B60N 2/002
USPC ......................................................... 701/36
See application file for complete search history.

(56) References Cited

U.S. PATENT DOCUMENTS

| 3,863,202 | A * | 1/1975 | Landrum, Jr. ........... G01V 1/04 367/190 |
| 6,266,592 | B1 * | 7/2001 | LeMense ............. B60N 2/0276 180/271 |
| 6,427,518 | B1 * | 8/2002 | Miekley ............. G01C 19/5691 73/1.37 |
| 6,563,761 | B1 * | 5/2003 | Schaffran ............... B60N 2/002 280/735 |
| 8,457,692 | B2 * | 6/2013 | Fyke ....................... H04K 3/415 340/5.64 |
| 8,625,557 | B2 * | 1/2014 | Fukuda .................... G06F 1/163 370/311 |
| 8,665,077 | B2 * | 3/2014 | Richter ............... B60R 25/2027 307/10.1 |
| 8,704,651 | B2 * | 4/2014 | Nix ........................ B60K 37/00 340/438 |
| 2003/0228020 | A1 * | 12/2003 | Lentinturier ........... G10K 15/02 381/77 |
| 2003/0228021 | A1 * | 12/2003 | Letinturier ............... G08B 3/10 381/86 |
| 2004/0113800 | A1 * | 6/2004 | Benedict ................ G08B 21/06 340/576 |

(Continued)

FOREIGN PATENT DOCUMENTS

| DE | 4301160 A | 7/1994 |
| DE | 102008047803 A | 4/2009 |
| DE | 102007056802 A | 6/2009 |

*Primary Examiner* — McDieunel Marc
*Assistant Examiner* — James E Stroud
(74) *Attorney, Agent, or Firm* — Andrew Wilford

(57) ABSTRACT

A system for passing electrical signals through a living body has a transmitter on one side of a body for feeding thereto a predetermined electrical signal on at least two separate channels on respective different frequencies and a receiver on the other side of the body for receiving the signal on each of the channels. An evaluating unit connected to the receiver evaluates the received signals and selecting from them one signal for further processing.

9 Claims, 1 Drawing Sheet

(56) References Cited

U.S. PATENT DOCUMENTS

| | | | | |
|---|---|---|---|---|
| 2005/0134448 | A1* | 6/2005 | Perlman | B60Q 1/26 340/468 |
| 2008/0021706 | A1* | 1/2008 | Bruwer | H04R 27/00 704/233 |
| 2012/0188172 | A1* | 7/2012 | Fong | G06F 3/042 345/173 |
| 2013/0261902 | A1* | 10/2013 | Zhdanov | E02F 3/7613 701/50 |
| 2015/0124988 | A1* | 5/2015 | Song | G10L 17/00 381/71.4 |
| 2015/0127338 | A1* | 5/2015 | Reuter | G10L 15/20 704/233 |

\* cited by examiner

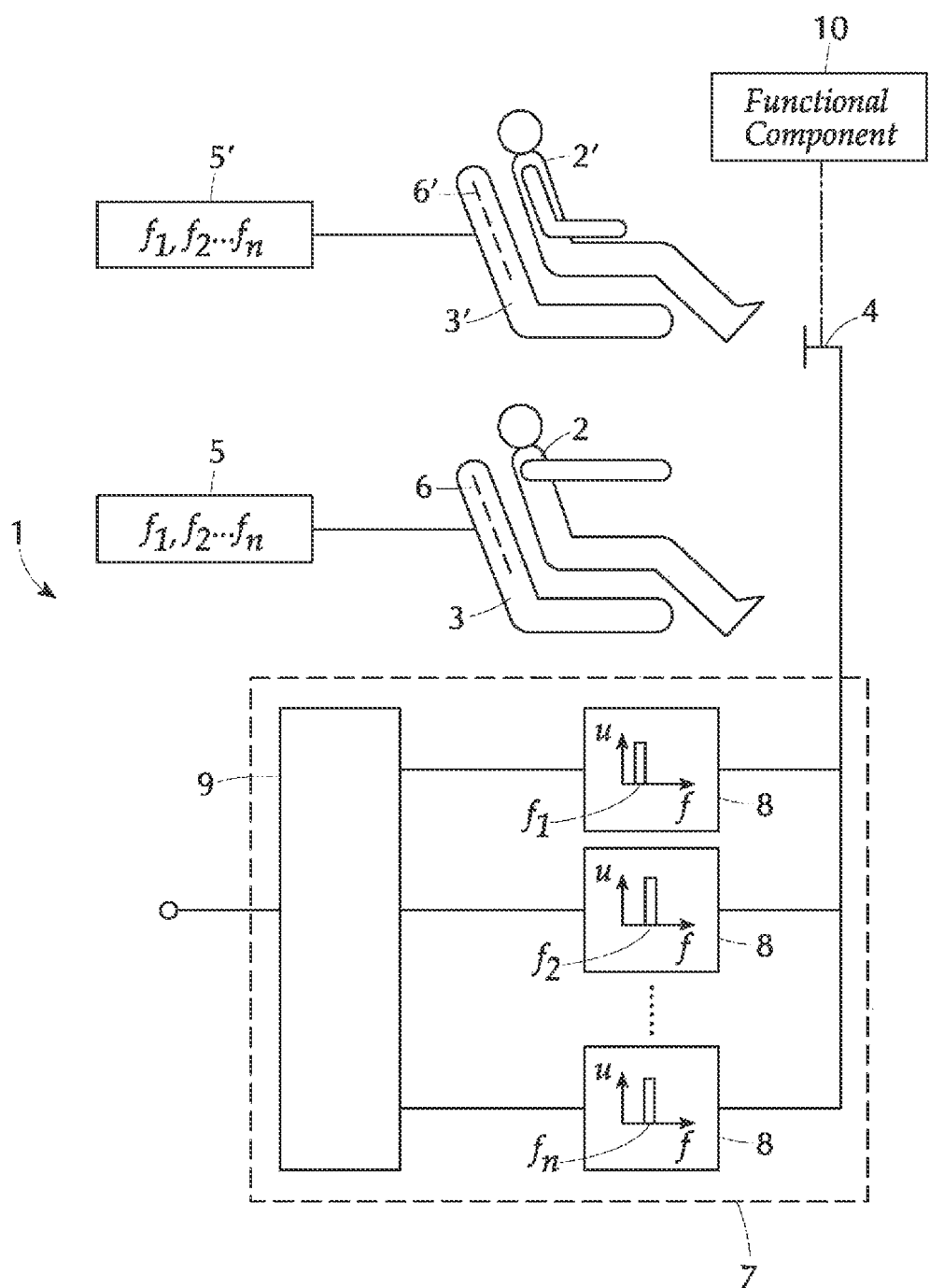

SYSTEM FOR PASSING ELECTRICAL SIGNALS THROUGH A LIVING BODY

FIELD OF THE INVENTION

The present invention relates to a system for passing signals through a living body. More particularly this invention concerns a motor-vehicle control system with passenger/driver discrimination.

BACKGROUND OF THE INVENTION

The invention relates to a system for transmitting electrical signals via the body of a living creature and comprising a transmitter on one side of the body that can output a signal that can be fed applied to the body, passed through the body, and outputted from the body. The system also has a receiver on the other side of the body that can receive the signal transmitted by the transmitter and passed through the body.

Such systems are known from the prior art. A common feature of such systems is that electrical signals are fed into the human body, and are then distributed over the entire body because of the conductive skin surface. These systems are used in the field of presence detection, seat occupancy, detection of the proximity to a switching element, gesture detection and in the differentiation between drivers and passengers in the actuation of switching or operating elements.

DE 43 01 160 describes such a system in which a vehicle's equipment and devices are provided with operating elements as control elements. In this connection electrical signal-output and input elements are provided in the driver's seat and in the front passenger seat and in an operating element. When contact is made with the operating element a signal path is formed through which a signal can be supplied to an evaluation circuit. When detected, this signal allows the evaluation circuit to detect whether the operating element is actuated by the driver or the passenger. To this end signals are fed to the driver and into the passenger at different frequencies or at different times, so that the evaluation circuit of the receiver can distinguish between actuation by the driver and actuation by the passenger based on the respective signal. Accordingly the evaluation circuit is implemented as a frequency and/or time selection circuit.

DE 10 2007 056 802 describes such a system that allows a functional component of the vehicle to be controlled from at least two different seats by at least one operating element. In this case electrical signals are coupled capacitively into the body of the person located in each of the seats. In the receiver of this apparatus, differences in the signals allow a distinction to be made between actuation of the operating element by the driver located in one seat or the passenger located in the other seat.

A method is known from DE 10 2008 047 803 for transmitting signals with at least two transmitters operating with near-field technology. The respective transmitters output their signals or data in respective time windows.

U.S. Pat. No. 8,665,077 describes a circuit for selective switching signal generation. The circuit arrangement is used in a method for selective generation of a switching signal specifically for controlling functional components of a motor vehicle. In this case respective specific electrical signals are each fed to the body via actuating or operating elements and applied to the driver or passenger therein via a coupling surface or antenna provided in the vehicle seat.

The systems known from the prior art are not entirely suitable for use in motor vehicles, since they frequently do not meet the requirements for the availability of the signal. In particular the systems that operate sequentially or by time multiplexing are not suitable for permanent and precise detection of fast approaches, changes of position or gestures, since the necessary signal is not continuously available. Moreover such systems must in particular meet requirements for availability taking into account the resistance to interference. A system that regularly functions not at all or only unsatisfactorily because of interference signals frequently emitted during operation of the motor vehicle in the range of the signal frequencies used, leads to a high degree of dissatisfaction in the users of such systems. This applies in particular with regard to the evaluation and the plausibility checking of signals with which decisions relevant to safety are associated, for example the anti-pinch control in an electric sliding roof. Accordingly the systems described above are not suitable for meeting all the requirements occurring in operation of the motor vehicle.

Furthermore systems in which the so-called frequency hopping method is actively applied are known from the prior art systems. Such systems operate in comparatively narrow frequency bands. Therefore the probability exists that the working frequency of the corresponding system is distorted by an interference signal at the same frequency, so that the entire system cannot meet the requirements placed on it. If the system recognizes a distorted signal, then it is switched to a different frequency according to a pre-programmed scheme. This operation is repeated until an interference-free frequency has been found.

This procedure can be implemented comparatively simply in such systems in which a stable data link exists between the transmitter and the receiver, since then in the event of interference the receiver sends a corresponding signal or corresponding information to the transmitter to change the frequency.

The transmitter alone is not usually capable of recognizing an interference signal. For this purpose the transmitter itself would have to have a receiver. The expenditure on technology and design for this is generally too high. Moreover the transmitter could not recognize interference signals if the interference signal only occurs near the receiver.

Furthermore such systems in which no data link exists between the receiver and the transmitter are widespread. This applies for example in the case of transmitters carried on the body or locators carried on the body. However, also in motor vehicle applications locators are built into the vehicle seats, and the receivers are for example in the operating part of an air conditioning system and/or in the roof module for controlling a sliding roof. In such applications a data link between the receivers and the transmitters would be technically complex and associated with considerable costs.

OBJECTS OF THE INVENTION

It is therefore an object of the present invention to provide an improved system for passing electrical signals through a living body, in particular for controlling a motor-vehicle functional component.

Another object is the provision of such an improved system for passing electrical signals through a living body that overcomes the above-given disadvantages, in particular that with comparatively low expenditure on technology and design a high reliability and a high availability can be achieved.

SUMMARY OF THE INVENTION

A system for passing electrical signals through a living body has according to the invention a transmitter on one side of a body for feeding thereto a predetermined electrical signal on at least two separate channels on respective different frequencies and a receiver on the other side of the body for receiving the signal on each of the channels. An evaluating unit connected to the receiver evaluates the received signals and selecting from them one signal for further processing.

Thus the signal is transmitted simultaneously by the transmitter on at least two frequencies of a frequency spectrum specific to the transmitter. In this case for example a locating signal is generated at a plurality of frequencies $f_1$, $f_2 \ldots f_n$. These frequencies are precisely defined and assigned to the relevant transmitter or the relevant location. The signal is transmitted continuously at these precisely defined frequencies.

According to the invention, several transmitters can be provided or the transmitter can have several transmitting units. A signal specific to the respective transmitting unit is outputted simultaneously on a frequency spectrum specific to the respective transmitting unit with at least two frequencies $f_1, f_2 \ldots f_n$. Each transmitter or each transmitting unit transmits a signal which is specific to it, namely in each case on a plurality of frequencies specific to the relevant transmitter or the relevant transmitting unit.

According to a modification of the invention the receiver has individual band-pass filters. Each of these band-pass filters can be assigned to one of the frequencies used in the entire system.

Alternatively it is possible that the receiver has adjustable band-pass filters that can be switched between the frequencies used in the system.

Advantageously the frequencies belonging to a specific frequency spectrum are a sufficiently large distance from one another that there is no crosstalk or interference.

According to an advantageous modification, the receiver of the system according to the invention has a selector by means of which an interference-free signal can be selected from the frequency signals of the transmitter or of a transmitting unit received on the receiver and by means of which the receiver can be set to receive this interference-free signal.

In a method according to the invention for passing electrical signals through the body of a living creature, a signal is transmitted, fed to the body, relayed from the body and received, and the signal is transmitted simultaneously on at least two frequencies.

According to a modification of this method according to the invention at least two specific signals are transmitted simultaneously in each case on a frequency spectrum specific to the respective signal with in each case at least two frequencies.

The frequency signals of the transmitter are advantageously scanned until an interference-free frequency signal is received; then the system is switched to focus on and receive this interference-free frequency.

According to a modification of the method according to the invention the different frequency signals of the transmitter or of a transmitting unit are permanently synchronously received. This enables a safety-related or similar function to only take place when at least three different frequency signals of a specific frequency spectrum have the same result.

BRIEF DESCRIPTION OF THE DRAWING

The above and other objects, features, and advantages will become more readily apparent from the following description, reference being made to the sole FIGURE of the accompanying showing a schematic diagram of the system of this invention.

SPECIFIC DESCRIPTION OF THE INVENTION

As seen in the drawing a system 1 according to the invention for passing electrical signals through the body 2 or 2' of a living creature, in this case a person, is used for example, as illustrated in principle in the drawing, in conjunction with a vehicle seat 3 or 3' of a motor vehicle not otherwise illustrated. An operating element 4 can be actuated by the person 2, here the driver, in the seat 3 or by the person 2', here a passenger, in the seat 3'. Here it is necessary to distinguish whether the element 4 is actuated by the driver 2 located in the vehicle seat 3 or by the passenger 2' located in a vehicle seat 3'. For instance the element 4 could control a functional component 10 such as the radio or climate-control system that the driver 2 should not be operating while driving at high speed.

A transmitter 5 outputs a coded signal specific to the vehicle seat 3 of the driver or the operator of the motor vehicle is assigned to the vehicle seat 3 occupied by the driver 2, and a transmitter 5' output a coded signal specific to the vehicle seat 3' of the passenger 2'. These signals are fed to the bodies 2 and 2' in the vehicle seats 3 and 3' by respective coupling or antenna systems 6 and 6' provided in the vehicle seats 3 and 3'.

According to the invention, each of these signal is continuously outputted by the respective transmitter 5 or 5' at n different frequencies $f_1, f_2 \ldots f_n$. Accordingly these signals from the respective transmitters 5 and 5' to the coupling system 6 and from there are fed to the bodies 2 and 2'. If the operating element 4 is actuated by the driver, the signal is then passed to a receiver 7. The receiver 7 is provided with a number of band-pass filters corresponding to the number of transmission frequencies outputted by the transmitters 5 and 5'. The filters 8 each case can only pass the frequency $f_1, f_2$, or $f_n$ of a respective one of the outputted signals to a control or evaluation unit 9 of the receiver 7.

Since each set of signals continuously outputted by each of the transmitters 5 and 5' is coded, it is possible for the evaluating unit to easily determine the seat occupied by the person with the hand or body part that was brought near enough to the control element 4 to pass its respective signal thereto. The receiver 7 can then ascertain with a high degree of reliability the vehicle seat from which the operating element 4 has been operated. Accordingly subsequent switching and/or control operations can be initiated, carried out or refused.

A plurality of such transmitting units each assigned to a seat thus cooperate with the receiver 7 described above. The number of filters 8 on the receiver is adapted to the number of frequencies $f_1, f_2 \ldots f_n$ used overall by all the transmitters of which only two are shown here.

Since the signals of each transmitter are outputted continuously simultaneously at a plurality of frequencies specific to the respective transmitter, it can be ascertained with the highest degree of reliability in the receiver 7—independently of any interference signals that may be present—when a signal relayed by the operating element 4 from the vehicle seat 3 or 3' from the operating element 4 should be actuated.

As an alternative to the individual band-pass filters 8 described above, the receiver may also have one or a small number of variable band-pass filters.

The selector or evaluation unit 9 of the receiver 7 selects an interference-free signal from the frequency signals received from the individual filters 8. The receiver 7 can then be tuned to this interference-free frequency signal.

For this purpose the selector or evaluation unit 9 is suitable for scanning the frequency signals of the transmitter 5 until it receives an interference-free frequency signal.

In case safety-related functions are to be initiated by means of the operating element 4, the receiver 7 can be preset so that enabling this safety-related or comparable function only takes place when at least for example three different frequency signals of a transmitter 5 or of a transmitting unit and thus of one of these associated frequency spectra have the same result.

I claim:

1. A system for passing electrical signals through a living body, the system comprising:
    a transmitter juxtaposed with one side of the body for feeding thereto a predetermined electrical signal on at least two separate channels on respective different frequencies such that the transmitted signal on two channels passes through the body;
    a receiver on the other side of the body for receiving the signal on each of the channels after passage of the signal through the body; and
    evaluating means connected to the receiver for evaluating the received signals and selecting from them one signal for further processing.

2. The system defined in claim 1, wherein the receiver has individual band-pass filters for each of the channels.

3. The system defined in claim 2, wherein the filters are adjustable.

4. The system defined in claim 1, wherein the one signal is selected that is most free of interference.

5. In combination with two motor-vehicle seats adapted to hold a driver and a passenger, a motor-vehicle subsystem, and a control element for the subsystem within reach of both of the seats, a system comprising:
    respective signal-output elements in the seats;
    a transmitter connected to both of the signal-output elements for feeding thereto different signals each on at least two different channels at different respective frequencies such that the signals are applied to the driver and passenger and can be detected at the control element when the driver or passenger nears it;
    a receiver connected to the control element for receiving the signals on each of the respective channels after passage of the signals through the bodies; and
    evaluating means connected to the receiver and to the functional component for evaluating all of the received signals and selecting from them one signal for further processing and operating or impeding operation of the functional component depending on whether the selected signal is from the driver or the passenger.

6. The combination defined in claim 5, wherein the evaluating means selects a signal based on freedom from interference.

7. A method of passing electrical signals through a living body, the method comprising the steps of:
    inputting into one side of a body a predetermined electrical signal on at least two separate channels on respective different frequencies such that the inputted signal passes on the two channels through the body;
    a receiver on the other side of the body for receiving the signal on each of the channels; and
    evaluating means connected to the receiver for evaluating the received signals and selecting from them one signal for further processing.

8. The method defined in claim 7, wherein the one signal is selected based on freedom from interference and thereafter this one signal is used.

9. The method defined in claim 7, wherein the evaluating means is connected to a safety-related motor-vehicle functional component and the receiver is connected to a control element of the subsystem, the method further comprising the step of:
    only enabling the subsystem when the receiver receives codes on three of the channels.

* * * * *